United States Patent
Bonnici et al.

(10) Patent No.: US 10,247,578 B2
(45) Date of Patent: Apr. 2, 2019

(54) PATH MEASUREMENT METHOD FOR A MAGNETIC SENSOR AND SENSOR

(71) Applicant: Methode Electronics Malta Ltd., Birkirkara (MT)

(72) Inventors: Allen Carl Bonnici, Mosta (MT); Steve Zahra, Zebbug (MT)

(73) Assignee: METHODE ELECTRONICS MALTA LTD., Birkirkara (MT)

( * ) Notice: Subject to any disclaimer, the term of this patent is extended or adjusted under 35 U.S.C. 154(b) by 128 days.

(21) Appl. No.: 14/848,704

(22) Filed: Sep. 9, 2015

(65) Prior Publication Data

US 2016/0076913 A1 Mar. 17, 2016

(30) Foreign Application Priority Data

Sep. 11, 2014 (DE) .......................... 10 2014 218 264
Aug. 26, 2015 (DE) .......................... 10 2015 114 205

(51) Int. Cl.
G01B 7/14 (2006.01)
G01D 5/20 (2006.01)
G01B 7/00 (2006.01)

(52) U.S. Cl.
CPC ........... *G01D 5/2006* (2013.01); *G01B 7/003* (2013.01)

(58) Field of Classification Search
CPC .... G01D 5/2053; G01D 5/2006; G01B 7/003; G01B 5/2006
USPC .................................................... 324/207.17
See application file for complete search history.

(56) References Cited

U.S. PATENT DOCUMENTS

| 4,235,079 | A | 11/1980 | Masser |
| 4,641,118 | A | 2/1987 | Hirose et al. |
| 5,045,785 | A | 9/1991 | Hansen |
| 7,420,362 | B2 * | 9/2008 | Gurich .................. F02M 59/44 324/207.19 |
| 7,576,532 | B2 * | 8/2009 | Van Steenwyk ....... G01D 5/202 324/176 |
| 2005/0258687 | A1 | 11/2005 | Zapf et al. |

FOREIGN PATENT DOCUMENTS

| DE | 3526199 C1 | 6/1986 |
| DE | 241644 A1 | 12/1986 |
| DE | 10025661 A1 | 12/2001 |
| DE | 10117274 A1 | 10/2002 |
| DE | 10242385 A1 | 4/2004 |

(Continued)

*Primary Examiner* — Reena Aurora
(74) *Attorney, Agent, or Firm* — Thompson Coburn LLP

(57) ABSTRACT

A method of path measurement uses eddy current principles and a sensor which interacts with a measuring object. The sensor has an electrical connector and a sensor coil. In accordance with the method, an operating voltage is applied to the sensor such that a magnetic field is built up by an oscillator in cooperation with the sensor coil. A measuring object may be moved in the vicinity of the sensor coil through an opening in the sensor coil to produce field strength changes adjacent to the coil and the oscillator. The field strength changes are detected by an evaluation circuit and transmitted to a microcontroller. The microcontroller processes the signals of the evaluation circuit and provides the evaluation circuit with said signals via an output and protection circuit. The sensor coil consists of a plurality of windings constructed in a planar manner.

17 Claims, 5 Drawing Sheets

(56) References Cited

FOREIGN PATENT DOCUMENTS

| | | |
|---|---|---|
| DE | 202004019489 U1 | 5/2005 |
| DE | 102006031139 A1 | 1/2008 |
| DE | 102009004688 A1 | 7/2010 |
| DE | 102011102829 A1 | 12/2012 |
| DE | 102011085740 A1 | 5/2013 |
| DE | 102012011202 A1 | 9/2013 |
| JP | 2000-161985 A | 6/2000 |
| JP | 2007-505534 A | 3/2007 |

\* cited by examiner

PATH MEASUREMENT METHOD FOR A MAGNETIC SENSOR AND SENSOR

RELATED APPLICATION DATA

This application claims the benefit of German patent applications DE 10 2014 218 264.6, filed on Sep. 11, 2014, currently pending, and DE 10 2015 114 205.8 filed on Aug. 26, 2015, currently pending, the disclosures of which are incorporated by reference herein.

BACKGROUND AND SUMMARY

The invention relates to a path measurement method for a sensor which cooperates and/or interacts with a measuring object and/or transducer element and which is based on the so-called eddy current principle. The invention further relates to the detection of paths of measuring objects which are disposed in the vicinity of the sensor coil. The sensor and the associated measuring object are moveable relative to one another. The invention further relates to a sensor for path measurement.

Various embodiments of inductively operating sensors for path measurement are known from practice. In particular, contactless path measuring systems are known which provide information on the motions of associated measuring objects or specific transducer elements based on changes in magnetic field strength.

In known assemblies, for example, cylindrical coils are used into or out of which the measuring objects are moved. The measuring objects have at least geometrically irregular shapes influencing the magnetic field when passing through the coil.

Furthermore, inductive position sensors for use as so-called limit switches are known in which the measuring object is moved towards the inductive sensor and stopped in front of or by means of the latter, with the changes in field strength being detected and processed into a measuring signal.

It is known to combine the inductive position sensors with electronic units in order to be able to generate a standardized measuring signal which can be processed in the subsequent control devices.

The likewise known principle of capacitive path measurement is based on the mode of operation of the ideal plate capacitor. The two plate electrodes are formed by the sensor and the opposite measuring object. In the event that constant alternating current flows through the sensor capacitor, the amplitude of the alternating current on the sensor is proportional to the distance of the capacitor electrodes. Capacitive sensors are designed for contactless path, distance and position measurements. The change in distance of the measuring object from the sensor is detected by means of a controller, processed and provided as a measured value for further process stages. In order to achieve a reliable measurement, an unvarying dielectric constant between the sensor and the measuring object must be ensured, because the measuring system does not only depend on the distance of the electrodes but also reacts to changes of the dielectric in the measuring gap. Therefore, capacitive position sensor systems are especially used for high-precision applications in laboratories and industry, for example in clean-room areas. For this reason, however, they are dependent on a clean and dry environment. Furthermore, they are complex both in terms of production and application.

Sensors are especially required for transmission devices which, for functional reasons, have to perform a linear motion.

This also includes mechanical parts moving back and forth as well as transmission devices in motor vehicles and engines. The location of specific elements must commonly be determined to know the latter's position and be able to start the next steps via downstream control systems.

Such functions are especially performed in manual transmissions, hydraulic valves and cylinders, clutches and various actuating elements, such as foot-operated pedals.

Furthermore, the detection of shift positions of shift rods in automated transmissions, the detection of thermal expansions of a material or a product, measurements of radial roll shiftings, applications in combustion engines, brake pedals and much else are, inter alia, fields of application.

Whilst using the sensors in the above cases, they are heavily exposed to moisture, dirt, oils, greases and mechanical stresses. Therefore, it is necessary to provide sensors for high precision in a rough industrial environment including stress, dirt and temperature.

For such applications, more and more sensor systems are used which work according to the so-called eddy current principle.

The eddy current refers to a current which is induced in an extended electrical conductor in a time-varying magnetic field or in a moving conductor in a magnetic field which is constant in time, but spatially inhomogeneous. Eddy current testing serves, inter alia, for the non-destructive testing of materials as well as the characterization of materials and is based on the measurement of the amplitude and the phase of eddy currents.

The eddy current principle is used for measurements on electrically conductive materials which may have both ferromagnetic and non-ferromagnetic properties. High-frequency alternating current flows through a coil incorporated into a sensor housing. The electromagnetic coil field induces eddy currents in the conductive measuring object, thereby changing the resulting alternating-current resistance of the coil. This change in impedance produces an electrical signal which is proportional to the distance of the measuring object from the sensor coil. Eddy current sensors detect distances towards metal objects in a contactless and wear-free manner. The high-frequency field lines emanating from the sensor coil are not significantly disturbed by non-metallic materials, which is why measurements can be carried out even in case of heavy soiling, stress and oil. Furthermore, this special feature allows for the measurement on metal objects coated with plastics, thereby enabling, for example, the detection of layer thicknesses. All of this is known.

An example of its application follows from DE 101 17 724 A1, which describes a device for determining the torque on a rotatable metal shaft. A sensor head of an eddy current sensor is radially directed towards a shaft. The electrical conductivity of the shaft changes according to a torque applied to the shaft. This change causes a change in coupling power of the eddy current sensor, which is detected in an evaluation electronics assembly. In this way, it is possible to reliably detect the torque of the shaft without substantial structural interventions without making substantial constructional changes to the shaft.

A further example of its application is shown in DE 10 2011 102 829 A1 relating to a locking device for inhibiting the engagement of the reverse gear of a motor vehicle transmission.

Eddy current technology is generally used to detect a displacement of a part or a linear or rotary change in the spacing of at least two parts and, as a consequence thereof, the associated derivations, for example, of speed and acceleration.

In practical application, however, the aforementioned eddy current path measurement methods only allow for the detection of distances from the measuring object in the range from 5 mm to 10 mm. Thus, the possible applications are restricted, because requirements in respect of maximum size are imposed on such sensors depending on the place of installation.

Furthermore, in conventional eddy current path measurement sensors, continuous sensing or measurement of the object to be checked was carried out, with specific points or events in the overall sensing or measuring process, for example specific switching points, being singled out. However, this involves an unnecessary restriction of possible uses of the sensor itself.

It is likewise required to reliably transmit the measured values detected by the sensor to the downstream evaluation and control units. In this respect, too, external influences must not falsify the signals.

It is therefore the object of the invention to propose a path measurement method according to the eddy current principle for a sensor as well as a device according to the eddy current principle which cooperate and interact with a measuring object and/or transducer element.

A further object of the invention is to develop a contactless sensor for path measurements in such a way that it is easy to manufacture, the measuring object may be a simple mechanical part and the inductive sensor is also capable of operating under difficult external conditions. In addition, positioning tolerances are to be avoided.

A further object is to construct the sensor as small as possible and to extend the range of measurement.

Furthermore, the eddy current sensor should be designed for the contactless detection of path, distance, displacement, position but also oscillation and vibration. In the context of explaining the present invention, all these functions are also summarized under the term "path measurement".

In addition, the eddy current sensor should reliably function without housing as well as accommodated in a housing.

Furthermore, it should be possible to use standard electronics.

Moreover, it should be possible to provide a sensor and a method in which the result of the sensing or detection of the motion of the conductive measuring object is ensured consistently and/or completely so that comprehensive information may be obtained from this complete signal determination, for example the change of gradient from positive to negative and vice versa permits determination of a direction change of the path of motions.

In the following description, exemplary embodiments and claims, the terms listed below are used, having the following meaning:

Path measurement method—a measurement method which is suited to detect the change in position of a measuring object and/or transducer element in an axial direction, and to transform it into electrical signals by means of a sensor. For reasons of simplification, it is hereinafter referred to as the measuring object/transducer element or—for further simplification—as the measuring object.

Sensor—a physical unit which is capable of detecting changes in field strength, such as caused by a moving measuring object, by means of a measuring coil arrangement. The term is understood to mean, in particular, a sensing element, a pickup, a measuring element, a detector, a probe, although this is not intended as a limitation.

Measuring object—a part, preferably a part of a mechanical device, which is capable of performing a longitudinal motion, thus influencing the existing magnetic field of the position sensor.

Transducer element—an element which provides a physical value depending on the position, with the physical value resulting in an electrical, magnetic or inductive transducer signal.

Metal target—a metal measuring object which is made from or contains a metal material, for example steel, nickel, copper, aluminium, thus also a plastic part coated with a metal layer.

Sensor coil—a part which is composed of a plurality of partial windings and/or layers and which generates the magnetic field required for the purposes of measuring preferably in cooperation with an oscillator. Preferably, it is made from copper.

Microcontroller—an electronic circuit which substantially combines functions of an oscillator for the excitation of an oscillating circuit, a voltage regulator, an evaluation circuit as well as an output and protection circuit.

Planar—a feature of the coil and/or its layers when being substantially flat, plane, preferably even, straight, smooth, non-corrugated.

Shaft—comprises in terms of geometry a shaft, handle, flag, drawbar, full-floating axle, drive shaft, axle, spindle or roller, in particular the metal target and/or the measuring object.

Position sensor—a device which does not only detect the path and the distance but also the displacement, position as well as oscillation and vibration.

Eddy current testing—(also referred to as eddy current method), an electrical method for testing the measuring object or transducer element. During testing, a coil generates a changing magnetic field which induces eddy currents in the material to be tested. When carrying out the measurement, the density of the eddy current is detected by the magnetic field generated by the eddy current, using a sensor which also preferably contains the excitation coil. The parameters measured may be the amplitude and the phase displacement towards the excitation signal. The eddy current testing is performed, in particular, on the basis of a known magnetic field which is generated by the sensor coil cooperating with a metal element. Since the interaction between the magnetic field and the metal target changes, eddy currents are generated in the metal target, which in turn causes energy loss in the circuit generating a magnetic field. As the energy loss can be measured and the energy loss increases with increasing interaction and thus leads to an increase in eddy currents, the microcontroller, which also controls the excitation circuit, transforms the energy loss value into an approximate value. By way of completion, reference is made to the explanations in respect of this principle provided in the introductory part of the present description.

According to the invention, a path measurement method for a sensor as well as a sensor are proposed in which the sensor coil is configured in such a way that it comprises a number of individual windings which in turn are interconnected to form the sensor coil.

The examples mentioned in the present description do not involve any limitation whatsoever. They merely serve the purpose of providing, inter alia, an example of functions or effects.

Preferably, sensor detection is performed in a completely contactless and/or touchless manner.

Furthermore, it is particularly preferred that sensor detection is performed by automatically detecting the application conditions and/or environmental conditions and/or by adapting to these conditions, for example to the current position of a gear selector lever in a motor vehicle.

Furthermore, according to the invention, a position sensor is provided with a sensor coil which is composed of a plurality of planar windings. The planar coil which is likewise formed by the planar windings may, of course, be configured to form a ring or any other desired geometrical structure.

The required magnetic field is generated through a choice of an appropriate number of the individual planar coil or coils by suitably interconnecting the latter if desired.

In many cases, a coil is provided for a measuring object.

A plurality of windings are preferably insulated from each other, for example by means of customary insulating materials, such as epoxy glass fabrics, which can be selected by the user in a product-specific manner depending on the intended use.

The individual coil and/or the plurality of coils are formed by a multilayer printed circuit board (so-called PCB) which in turn consists of at least two planar windings. Here, the known etching method may be applied for production, but other manufacturing methods are also possible.

In an embodiment according to the invention, the thickness of such a multilayer coil may be limited to 1.0 mm to 1.6 mm or may even be less. In another embodiment, the thickness may, however, be greater depending on the area of application or the required expenditure in manufacturing.

Windings arranged on top of each other on various layers are preferably connected in series. The printed circuit board has, for example, two layers facing upwards and downwards. In addition, further layers can be provided in the manner customary.

The planar windings are each arranged on a carrier medium.

Thus, by choosing an appropriate number of such coils constructed in a planar manner, the inductance of the sensor coil can be determined over a wide range, whereby, in cooperation with the oscillator disposed in the electronic unit, the possible operating frequency can also be adjusted over a wide range.

An individual planar winding can be implemented in such a way that, as a single element, it has as large an inductance as possible. In this way, it can be achieved that the number of planar windings to be combined with each other can be minimized.

A preferred embodiment may be that a planar winding is arranged on either side of a double-sided printed circuit board.

A further preferred embodiment of the sensor coil is implemented if the planar windings are integrated within a so-called multilayer printed circuit board and if more than two planar coils can thereby be interconnected.

Apart from the possibility of adjusting the inductance of the sensor coil, a sensor coil having a stable structure is produced by the embodiment according to the invention, which does not require any additional measures for its protection.

The sensor coil is in turn formed by a plurality of coils constructed in a planar manner, preferably by means of interconnection. It has surprisingly turned out that, by providing the coils constructed in a planar manner, it is possible to omit ferromagnetic coils, eliminate positioning tolerances, preferably use standard electronics, and, in particular, omit application-specific integrated circuits (so-called ASICs).

Each of the planar windings is designed with a blank inner area. This means that a measuring object and/or a transducer element and/or a metal target can be moved back and forth within the centre of the planar coil.

The planar windings are appropriately produced using printed circuit technology. It is, for example, possible to arrange one of the planar windings concentrically to each other on either side of a double-sided printed circuit board.

As a preferred embodiment of the sensor coil, a plurality of such planar coils is implemented by producing a multilayer printed circuit board. The resulting cascading of the individual coils allows for the achievement of the required inductance of the coil.

The described construction of the sensor coil has the advantage that the coil itself does not have to be generated by winding operations on an insulating winding body to be produced separately.

A multilayer printed circuit board provides the sensor coil likewise with the geometry and necessary protection, including fixing and insulating means, which have to be affixed subsequently in other coil forms.

The path measurement method for the sensor consists in tuning the sensor element in combination with an oscillator to a resonance frequency or to a specific oscillating frequency and generating thereby the inductance formed by the sensor coil by interconnecting a plurality of individual windings.

It is preferred that the coil has a centrally arranged hole-like recess or an opening.

As a result, the coil may receive a shaft. This shaft forms the measuring object, thus the transducer element and/or metal target.

The shaft contains, for example, metal, nickel, copper or aluminium.

The shaft preferably has a tubular design.

The sensor according to the invention in which the measuring object/transducer element has a varying geometry, in particular in the form of changes in cross section, is particularly preferred.

Preferred embodiments of such changes in cross section are annular grooves, bores, one-sided flat portions or varying materials.

In a particularly preferred embodiment, the measuring object/transducer element has an area with a continuous transition from a small diameter to a larger diameter, thus enabling a quasi-analogue determination of position.

A further embodiment of the path measurement method may be that a part can be moved close to the sensor coil at all and its position may be determined due to its geometrical design.

Furthermore, in the presence of geometrical irregularities, abrupt changes can also be detected and evaluated.

Especially the conical design involves a substantial advantage, because the arrangement enables sensing, detecting or measuring by means of an axial motion, without the sensing process being affected or even being disturbed by vibrations or unfavourable factors.

This means that the measuring object/transducer element is present in the area of the sensor coil but, in contrast to the coil, can change its position by performing an axial motion and, in contrast to the coil, thus changes in cross section. For this reason, a conical design is advantageous.

Depending on the area of application, the person skilled in the art may choose different geometrical embodiments.

This advantage applies all the more if the shaft is mounted in a sleeve or a housing or in a tubular section, for example by means of a three-dimensional support, which contributes to a further reduction of possible vibrations and thus further enhances accuracy of the sensing process. In this way, it is largely protected against environmental influences.

As a result, the so-called electrical noise is likewise decreased.

Due to this especially conical design, even great distances from the measuring object can be detected. With this design, it is possible to detect measuring objects at a distance of 25 mm to 40 mm and more, but, of course, also at a distance of less than 25 mm.

Vice versa, it is thus possible to reduce the frame sizes of the sensors compared to the conventional prior art. This involves cost advantages with respect to production.

Particularly in this preferred embodiment, the measuring object can thus have a varying geometry, but is nonetheless detected completely, preferably by the longitudinal motion of the measuring object within the coil. As a result of the different spacing due to the e.g. conical design of the shaft, the sensor coil detects, for example, the position, the displacement and the distance of a part to be detected or other features, such as defects in the surface texture, when the shaft performs the axial motion.

Instead of a motion of the measuring object in contrast to the statically arranged sensor coil, by way of kinematic reversal, the sensor coil may, of course, also be configured to be movable, whereas the measuring object is static.

The motion of the measuring object through the coil having a hole-like recess or an opening is transformed into a linear electrical signal according to the eddy current principle, which is further processed by the microprocessor depending on the requirements. As a result, the user is capable of identifying without difficulty the respective position of the measuring object.

Thus, deviations from standard results can quickly be detected, for example by predetermined or other known parameters.

The sensor consists of at least one electronic unit cooperating with a sensor coil, and an electronic connector serving for providing the supply voltage and transmitting signals. The aforementioned components may be combined in a common housing. The housing may be shaped in the manner customary.

A measuring object/transducer element is located in the vicinity of the sensor coil and moved in an axial longitudinal direction, thus changing the field strength in the area of the coil and, at the same time, the frequency of the oscillating circuit from the sensor coil and the oscillator. By means of an evaluation circuit, these changes are detected and converted into measured variables suitable for further processing. The information obtained is transmitted by the evaluation circuit to a microcontroller. The latter processes the information obtained using, inter alia, a stored programme sequence and develops therefrom control signals which can be further processed in external devices. An output and protection circuit is disposed in the electronic unit for trouble-free operation.

In order to ensure a stable operation and meet the required measurement conditions, a voltage regulator is further assigned to the electronic unit.

In a further embodiment of the path measurement method, when specific parameters are reached, a switching function according to the characteristic of a so-called threshold value switch can be provided, depending on specific parameters reached in the oscillating circuit from the oscillator and the sensor coil.

Furthermore, the measuring object/transducer element can have a part by which it is in contact with or connected to the object to be measured and/or to be detected. In this respect, the part and the measuring object/transducer element may be made from the same material.

The part can be guided centrally by means of a duct. This duct, which produces a support in all three dimensions, may, for example, be an inner ring arranged in within the sleeve, the housing or another tube section.

The arrangement for a path measurement sensor described above can be developed further in different ways.

For this purpose, in particular, a compression spring ensuring the continuous contact of the part with the parts to be detected may be assigned to the measuring object/transducer element.

Instead of a compression spring, other elastic, in particular resilient, structures may likewise be used, thereby enabling a motion of the measuring object in relation to the part to be detected which is largely free of play.

In an advantageous embodiment in which the system is not capable of providing the measuring object in the right geometry, location or material, by extending the housing, in particular the plastic encapsulation, by a sleeve, a housing or a tubular section, a spring-loaded measuring object can be accommodated and enclosed as an integrated sliding object within the sensor housing, with the integrated sliding object being guided through an element which can be placed on either side of the sleeve, the housing or the tubular section. The measuring object remains located on the outside of the encapsulated PCB portion, thus causing the closed and, in particular, sealing system for the electronics portion. The compression spring ensures the continuous contact with the actuating mechanism from the system which, for example, can be a plunger or a cam.

In cases where the arrangement of the electronic unit on the printed circuit board of the sensor coil is not possible or considered to be insufficient, an additional printed circuit board can carry this electronic unit and be connected to the sensor coil.

Thus, the invention has the advantage that it allows for carrying out a path measuring method using a sensor with a sensor coil consisting of a plurality of individual planar coils, wherein the sensor can be used over a wide range of parameters, whilst being robust and inexpensive to produce.

The path measurement method using the sensor is carried out in such a way that a measuring object/transducer element is arranged in the centre of the sensor coil and capable of moving towards the coil axis.

The mode of operation of the path measurement method consists in activating at first the electronic unit arranged in the sensor by applying an operating voltage. An oscillator existing in the electronic unit excites an oscillation in cooperation with the sensor coil, with an oscillation with a specific frequency being generated as a function of the parameters of the oscillator and the sensor coil and the sensor coil establishing a magnetic field.

Various measuring tasks can be performed by the path measurement method according to the invention. For example, it can be used for determining the positions of moveable rods, pins, shafts or housing components.

The use in automated manual transmissions or for the determination of position of clutch components is particularly preferable.

Further preferable uses may be the determination of position of hydraulic cylinders, gear racks, linear drives and other parts, provided that the latter's location/position can be detected by means of path measurements.

The path measurement method can be configured in such a way that path measurement is carried out continuously in relation to an actual position of the measuring object/transducer element.

Since the path measurement method involves the influencing of an oscillating circuit by means of metal objects, the oscillation parameters can be selected in such a way that the sensor does not only respond to ferromagnetic materials but also to any other metal materials. Thus, ferromagnetic materials, in particular for the coils, can even be omitted.

One embodiment of the path measurement method provides that the sensor is equipped with a switching function. This means that the sensor outputs a signal value when the measuring object/transducer element reaches a specific position.

The sensor coil works in combination with an oscillator which forms part of a microcontroller, whereby the resulting oscillating circuit is excited and oscillates at a frequency to be selected according to the specific application.

In order to keep the oscillating frequency sufficiently stable, the microcontroller may additionally be equipped with a voltage regulator and a temperature compensation circuit.

The field strength changes caused by the measuring objects/transducer elements likewise cause a change of the resonance frequency at which the oscillating circuit operates. Via an evaluation circuit which also forms part of the microcontroller, variations in nominal frequency can be determined and the respective measuring values and/or information transmitted to the actual microcontroller module. By means of a permanently stored programme, the latter can detect and evaluate the measuring values of the evaluation unit and output them via the output circuit.

The supply voltage of the sensor can be provided by a connector. The output signals of the microcontroller can likewise be transmitted by the same or another connector.

In a further embodiment, the common housing of the position sensor can be extended by means of housings on both sides in the area of the measuring object/transducer element, with the measuring object/transducer element being axially guided within said housings. In combination with a compression spring disposed within the housing, freedom from play is ensured. A guide bushing arranged at the other end of the measuring object/transducer element serves for the precise, concentric guidance thereof.

In a further embodiment in which the system is not capable of providing the measuring object in the right geometry, location or material, a spring-loaded measuring object can be accommodated and enclosed as an integrated sliding object within the sensor housing by extending the housing, in particular the plastic encapsulation, by a tubular section, with the integrated sliding object being guided through an element which can be placed on either side of the tubular element. The measuring object remains located on the outside of the encapsulated PCB portion, thus causing the closed and, in particular, sealing system for the electronics portion. The compression spring ensures the continuous contact with the actuating mechanism from the system which, for example, can be a plunger or a cam.

If necessary, the printed circuit board carrying the microcontroller can either be identical with the multilayer printed circuit board which forms the sensor coil, or it can be incorporated into an additional extension of the housing as a separate printed circuit board.

In a preferred embodiment, the position sensor with the individual parts described above is accommodated as a compact unit in a common housing.

Particularly preferably, the coil is encapsulated in a plastic housing and the sensor shaft, when in use or forming part of the sensor, is closed and, even more preferably, sealed, which means that, for example, oil can flow around the measuring object, namely in both applications, i.e. when the sensor shaft is in use, but also when detection or measurement takes place by means of the shaft. This means that, in both applications of the PCB, the electronics, the coil within the plastic housing is sealed in such a way that there is a closed system.

BRIEF DESCRIPTION OF THE DRAWINGS

The invention will be described below in greater detail with reference to some exemplary embodiments and drawings, in which.

DETAILED DESCRIPTION

Figure 1:
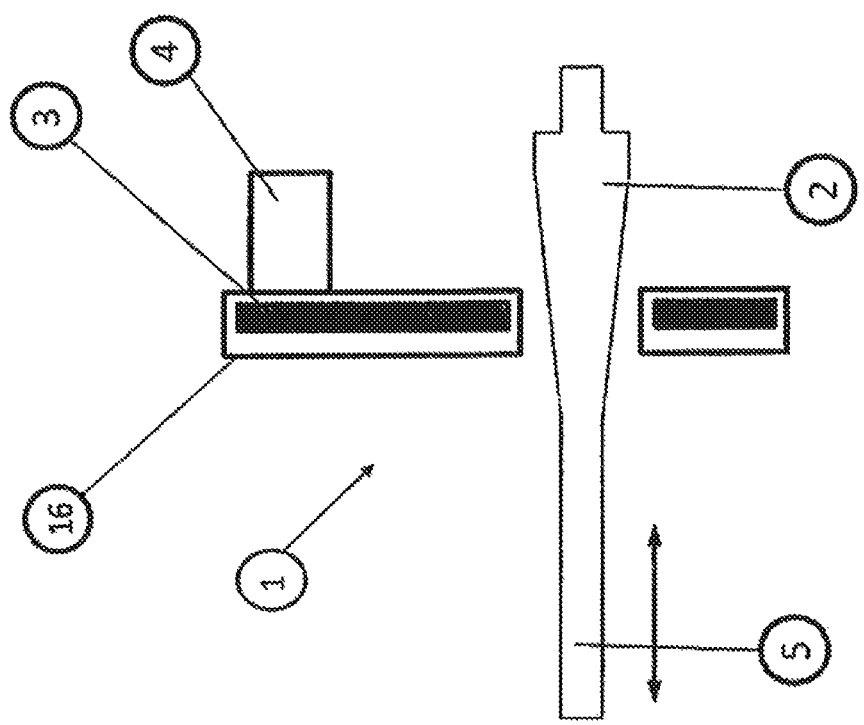
FIG. 1 shows a side view of the basic construction of the sensor.
Figure 2:
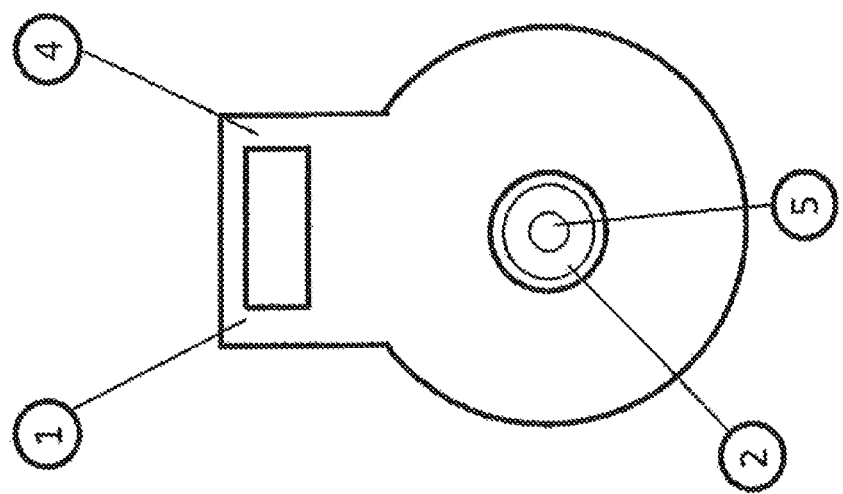
FIG. 2 shows a rear view of the sensor.

The path measurement method according to the invention is carried out using a position sensor 1 which cooperates and/or interacts with a measuring object/transducer element 2.

The sensor consists of at least one electronic unit cooperating with a sensor coil 3, and an electronic connector 4 serving for providing the supply voltage and transmitting signals. The aforementioned components are combined in a common housing 16. The housing 16 can be shaped in the manner customary.

The mode of operation of the path measurement method consists in activating at first the electronic unit arranged in the sensor by applying an operating voltage. An oscillator 11 existing in the electronic unit excites an oscillation in cooperation with the sensor coil 3, with an oscillation with a specific frequency being generated as a function of the parameters of the oscillator 11 and the sensor coil 3, and the sensor coil 3 establishing a magnetic field.

A measuring object/transducer element 2 is located in the vicinity of the sensor coil 3 and moved, thus changing the field strength in the area of the coil 10 and, at the same time, the frequency of the oscillating circuit from the sensor coil 3 and the oscillator 11. By means of an evaluation circuit 14, these changes are detected and converted into measured variables suitable for further processing. The information obtained is transmitted by the evaluation circuit 14 to a microcontroller 13. The latter processes the information obtained using, inter alia, a stored programme sequence and develops therefrom control signals which can be further processed in external devices. An output and protection circuit 15 is disposed in the electronic unit for trouble-free operation.

In order to ensure a stable operation and meet the required measurement conditions, a voltage regulator 12 is further assigned to the electronic unit.

Furthermore, the specific feature of the path measurement method is that the sensor coil 3 consists of a plurality of coils constructed in a planar manner.

The path measurement method can be configured in such a way that path measurement is carried out continuously in relation to an actual position of the measuring object/transducer element 2.

In a further embodiment of the path measurement method, when specific parameters are reached, a switching function according to the characteristic of a so-called threshold value switch can be provided, depending on specific parameters reached in the oscillating circuit from the oscillator 11 and the sensor coil 3.

A path measurement method with a sensor according to the invention in which the measuring object/transducer element 2 has geometrical irregularities is particularly preferred. This means that the measuring object/transducer element 2 is present in the area of the sensor coil 3 but can change its position and thus changes in cross section.

Preferred embodiments of such changes in cross section are annular grooves, bores, one-sided flat portions or varying materials.

A further embodiment of the path measurement method may be that a part comes close to the sensor coil 3 at all.

In a particularly preferred embodiment of the path measurement method, the measuring object/transducer element 2 has an area with a continuous transition from a small diameter to a larger diameter, thus enabling a quasi-analogue determination of position.

Furthermore, the measuring object/transducer element 2 can have a part 5 by which it is in contact with or connected to the parts to be measured.

Various measuring tasks can be performed by the path measurement method according to the invention. For example, it can be used for determining the positions of moveable rods, pins, shafts or housing components.

The use in automated manual transmissions or for the determination of position of clutch components is particularly preferable.

Further preferable uses may be the determination of position of hydraulic cylinders, gear racks, linear drives and other parts, provided that the latter's location/position can be detected by means of path measurements.

As already described above, the sensor is composed of at least one sensor coil 3, one electronic unit and one housing 16 (not shown).

According to the invention, the sensor coil 3 consists of a plurality of coils constructed in a planar manner, with the planar coils each being located on a carrier medium.

Thus, by choosing an appropriate number of such coils constructed in a planar manner, the inductance of the sensor coil 3 can be determined over a wide range, whereby, in cooperation with the oscillator 11 disposed in the electronic unit, the possible operating frequency can also be adjusted over a wide range.

An individual planar coil can be implemented in such a way that, as a single element, it has as large an inductance as possible. In this way, it can be achieved that the number of planar coils to be combined with each other can be minimized.

A preferred embodiment may be that a planar coil is arranged on either side of a double-sided printed circuit board.

A further preferred embodiment of the sensor coil 3 is implemented if the planar coils are integrated within a so-called multilayer printed circuit board and more than two planar coils can thereby be interconnected.

Apart from the possibility of adjusting the inductance of the sensor coil 3, a sensor coil 3 having a stable structure is produced by the embodiment according to the invention, which does not require any additional measures for its protection.

The position sensor 1 according to the invention can be developed further in accordance with various operating conditions. Thus, in one embodiment, the measuring object/transducer element 2 can be disposed in a sleeve 8. In this way, it is largely protected against environmental influences.

A compression spring 7 which ensures continuous contact of the part 5 with the parts to be detected can be assigned to the measuring object/transducer element 2.

The part 5 can be guided centrally by means of a duct 6.

Figure 3:
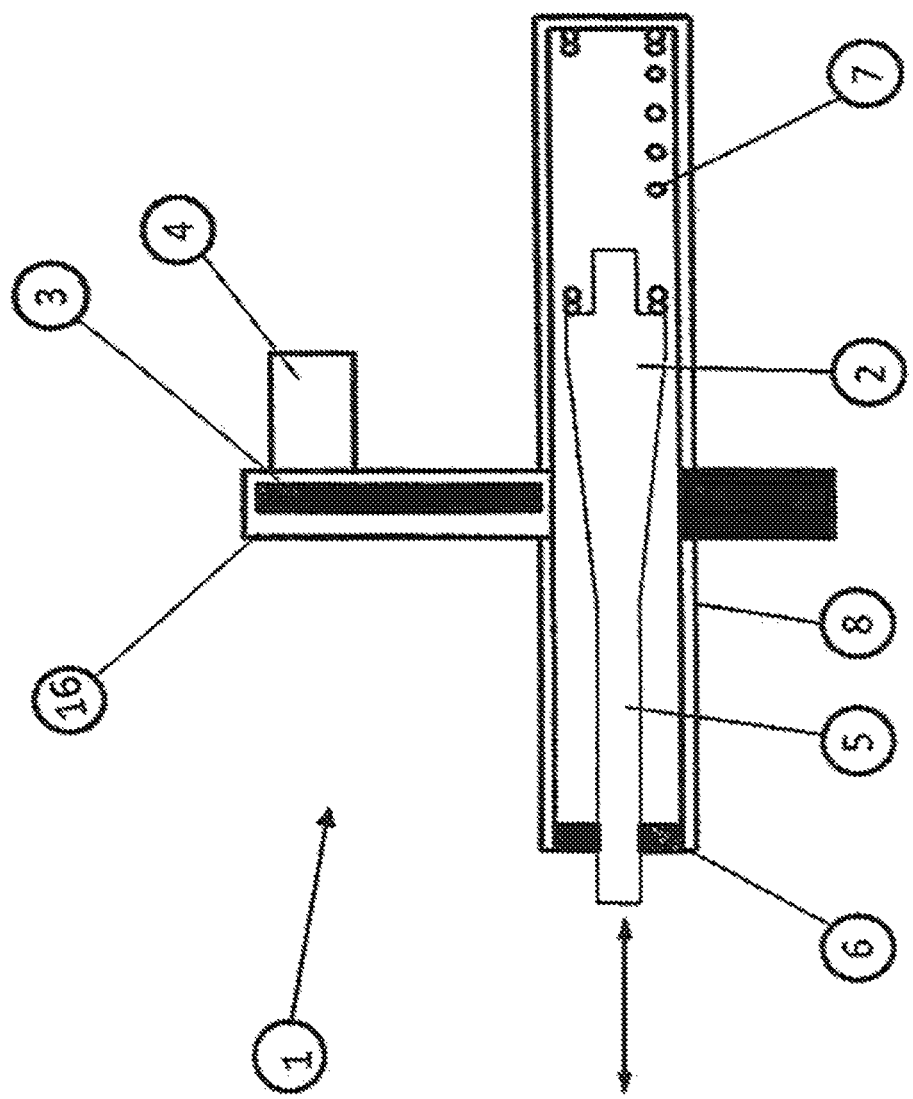
FIG. 3 shows an embodiment of the sensor with a measuring object/transducer element guided within a sleeve.
Figure 4:
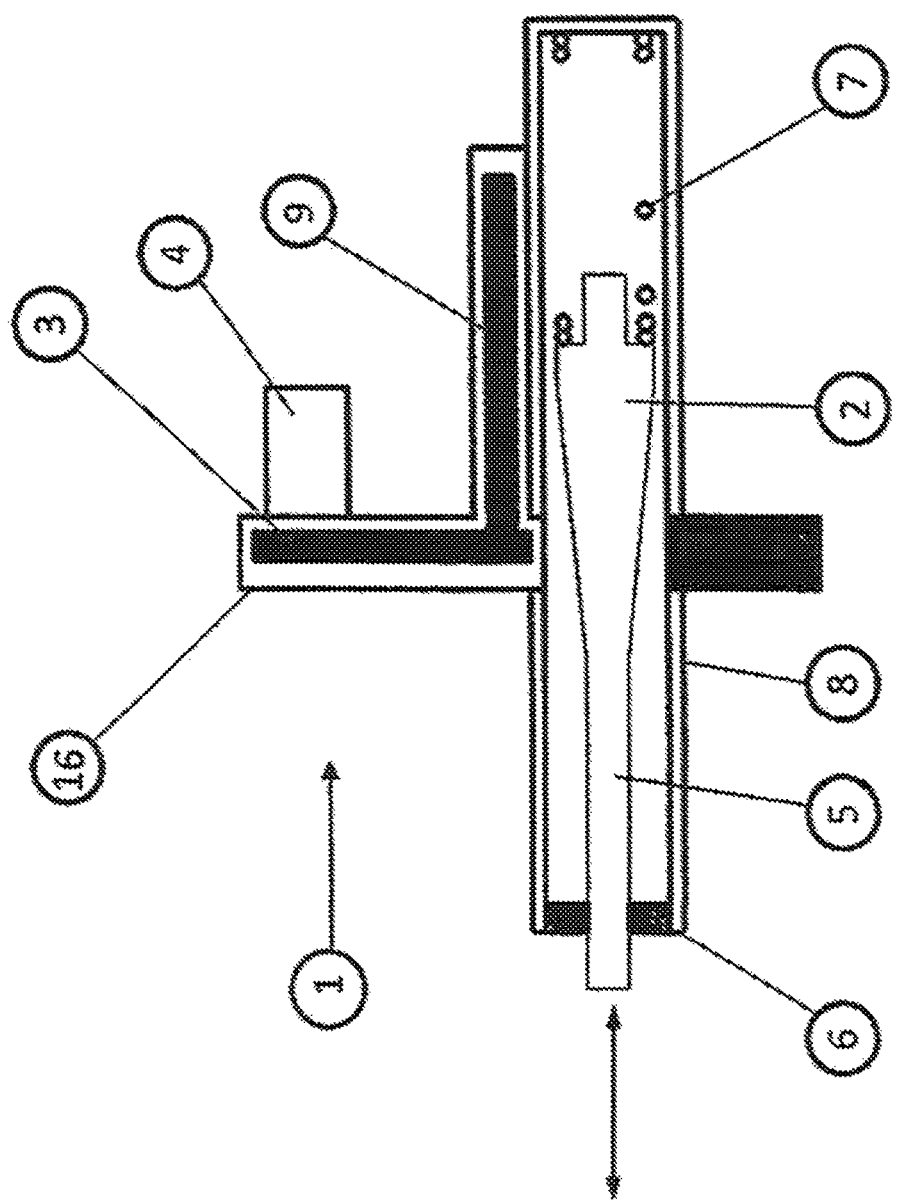
FIG. 4 shows a further embodiment of the sensor illustrated in FIG. 3.
Figure 5:
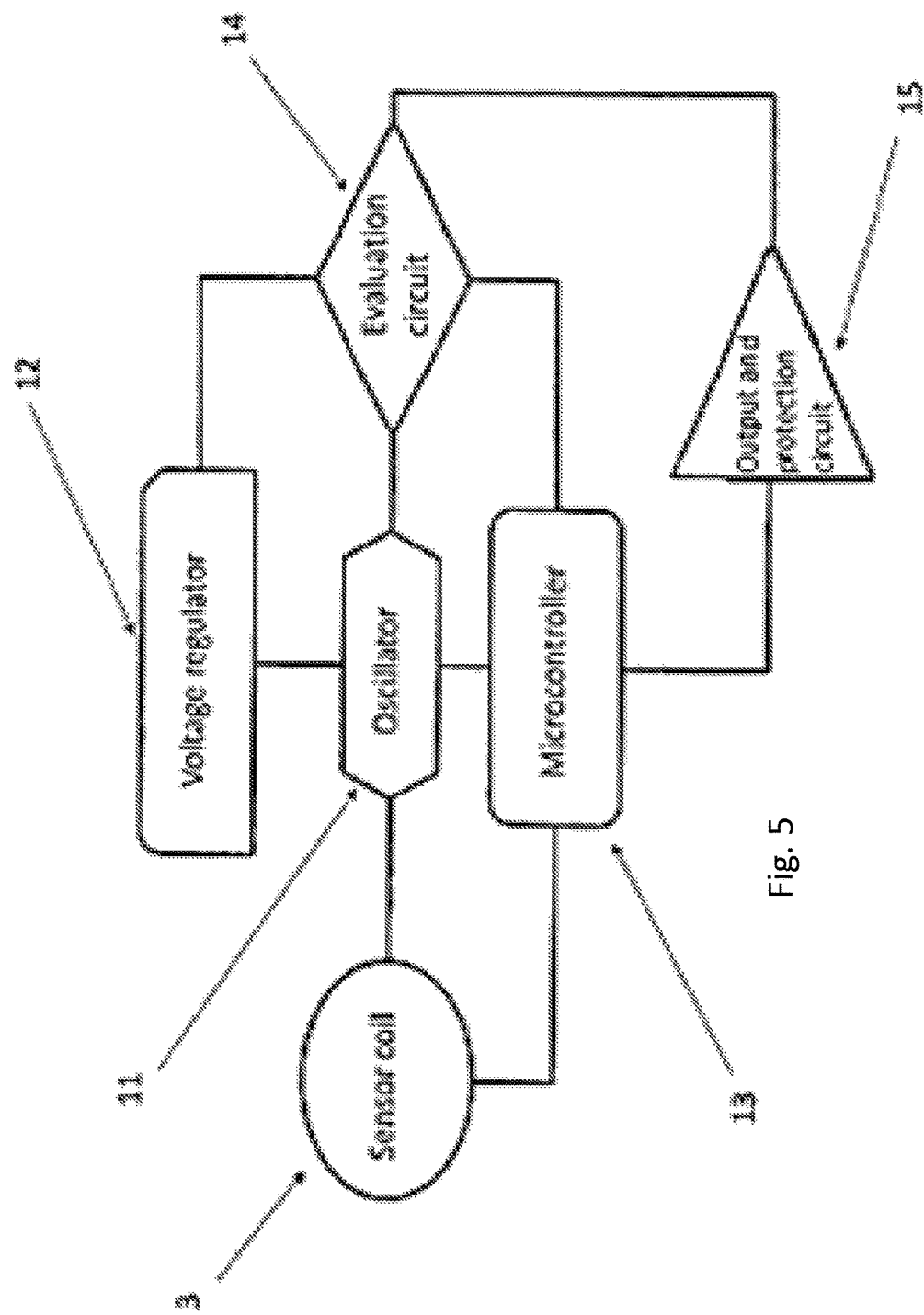
FIG. 5 shows a block diagram of the sensor.

In a further embodiment in which the system is not capable of providing the measuring object 2 in the right geometry, location or material, a spring 7 loaded measuring object 2 can be accommodated and enclosed as an integrated sliding object within the sensor housing 16 by extending the housing, in particular the plastic encapsulation 16, by a tubular section 8, with the integrated sliding object being guided through an element 6 which can be placed on either side of the tubular element 8 as shown in FIG. 3. The measuring object 2 remains located on the outside of the encapsulated PCB portion, thus causing the closed and, in particular, sealing system for the electronics portion. The compression spring 7 ensures the continuous contact with the actuating mechanism from the system which, for example, can be a plunger or a cam.

In cases where the arrangement of the electronic unit on the printed circuit board of the sensor coil is not possible, an additional printed circuit board 9 can carry this electronic unit and be connected to the sensor coil 3.

Thus, the invention has the advantage that it allows for carrying out a path measuring method using a sensor with a sensor coil consisting of a plurality of individual planar coils, wherein the sensor can be used over a wide range of parameters, whilst being robust and inexpensive to produce.

LIST OF REFERENCE NUMERALS

1. 1 position sensor
2. 2 measuring object, transducer element, metal target, shaft
3. 3 sensor coil
4. 4 connector
5. 5 part
6. 6 duct
7. 7 compression spring
8. 8 sleeve, housing, tubular section
9. 9 printed circuit board
10. 10 coil
11. 11 oscillator
12. 12 voltage regulator
13. 13 microcontroller
14. 14 evaluation circuit
15. 15 output and protection circuit
16. 16 housing

What is claimed is:

1. A method of path measurement using eddy current comprising:
   with a sensor that interacts with a measuring object (2), wherein the sensor comprises an electrical connector (4) and an electronic unit cooperating with a sensor coil (3):

(i) applying an operating voltage to the sensor in a manner such that a magnetic field is built up by an oscillator (11) disposed in the electronic unit in cooperation with the sensor coil (3);

(ii) moving the measuring object (2) axially through an opening in the sensor coil (3) in a manner to generate eddy currents in the measuring object and create changes in a field strength adjacent to the coil (3) and the oscillator (11); and (iii) detecting the field strength changes with an evaluation circuit (14) and transmitting signals indicative of the field strength changes to a microcontroller (13), wherein the microcontroller processes the signals of the evaluation circuit (14) and provides the evaluation circuit with the signals via an output and protection circuit (15);

wherein the coil is formed by a multilayer printed circuit board comprising at least two planar windings connected in series to form one continuous coil;

wherein the measuring object (2) has at least a portion with a varying geometric cross-section along an axial direction relative to the opening of the sensor coil adapted and configured to generate variations in the eddy currents in the measuring device as the measuring object is moved axially though the opening in the sensor coil when the operating voltage is applied to the sensor.

2. The path measurement method according to claim 1, characterized in that path measurement is one of two modes: (i) continuously in relation to a position of the measuring object (2), and (ii) as a switching function based upon selected operational parameters of the oscillating circuit.

3. The path measurement method according to claim 1, characterized in that the portion of the measuring object with a varying geometric cross-section has a continuously changing cross section.

4. An eddy current sensor for path measurement, wherein the sensor has at least one electronic unit including an oscillator (11) cooperating with a sensor coil (3) that induces eddy currents in a measuring object (2) and an electronic connector (4) for providing the supply voltage and transmitting signals for the sensor, wherein the sensor coil (3) comprises a multilayer printed circuit board upon which a plurality of windings constructed in a planar manner are arranged to form the sensor coil, wherein the sensor coil (3) has an opening through which the measuring object (2) can be moved axially; and wherein the measuring object has a portion with a geometric cross-section having a varying geometry adapted and configured to generate variations in the eddy currents in the measuring device as the measuring object is moved axially though the opening in the sensor coil when the supply voltage is provided to the sensor.

5. The eddy current sensor according to claim 4, characterized in that the portion of the measuring object (2) with the varying geometric cross section has a continuously changing cross section.

6. The eddy current sensor according to claim 5, characterized in that the measuring object (2) has a conical shape.

7. The eddy current sensor according to claim 4, characterized in that the measuring object (2) has a part (5) operatively connected to an object to be detected.

8. The eddy current sensor according to claim 7, characterized in that an elastic structure is associated with the measuring object (2).

9. The eddy current sensor according to claim 8, characterized in that the elastic structure is a compression spring (7).

10. The eddy current sensor according to claim 4, characterized in that the measuring object (2) has a part (5) adapted be in contact with an object to be detected.

11. The eddy current sensor according to claim 4, characterized in that the measuring object (2) is disposed in one of a sleeve (8), a housing (8), and a tubular section (8).

12. The eddy current sensor according to claim 11, characterized in that the measuring object (2) is three-dimensionally supported in the respective sleeve (8), the housing (8), and the tubular section (8).

13. The eddy current sensor according to claim 4, further comprising a housing (16) that encloses the sensor coil (3), the electrical connector (4), and the measuring object (2).

14. The eddy current sensor according to claim 4, characterized in that windings of the sensor coil (3) are each arranged on a carrier.

15. The eddy current sensor according to claim 4, characterized in that the windings of the sensor coil (3) are integrated within the multilayer printed circuit board.

16. The eddy current sensor according to claim 4, characterized in that the sensor contains an evaluation circuit for detecting parameters of the oscillator.

17. The eddy current sensor according to claim 16, characterized in that the electronic unit contains a microcontroller (13) having a memory a stored program configured to receive signals of the evaluation circuit (14), process said signals, and output said signals to an output and protection circuit (15).

\* \* \* \* \*